(12) United States Patent
Van Heuklon et al.

(10) Patent No.: US 11,593,732 B2
(45) Date of Patent: Feb. 28, 2023

(54) LICENSE ORCHESTRATOR TO MOST EFFICIENTLY DISTRIBUTE FEE-BASED LICENSES

(71) Applicant: LENOVO Enterprise Solutions (Singapore) PTE. LTD., New Tech Park (SG)

(72) Inventors: Jeffery Van Heuklon, Rochester, MN (US); Caihong Zhang, Shanghai (CN); Fred Bower, III, Durham, NC (US); Charles Queen, Apex, NC (US)

(73) Assignee: LENOVO Enterprise Solutions (Singapore) PTE. LTD., New Tech Park (SG)

( * ) Notice: Subject to any disclaimer, the term of this patent is extended or adjusted under 35 U.S.C. 154(b) by 0 days.

(21) Appl. No.: 17/214,642

(22) Filed: Mar. 26, 2021

(65) Prior Publication Data
US 2022/0309426 A1 Sep. 29, 2022

(51) Int. Cl.
*G06Q 10/06* (2023.01)
*G06N 20/00* (2019.01)
(Continued)

(52) U.S. Cl.
CPC ..... *G06Q 10/06313* (2013.01); *G06F 9/5044* (2013.01); *G06N 20/00* (2019.01); *G06Q 10/06312* (2013.01); *G06Q 20/1235* (2013.01)

(58) Field of Classification Search
None
See application file for complete search history.

(56) References Cited

U.S. PATENT DOCUMENTS

| 8,650,296 B1 * | 2/2014 | Herington | G06F 9/5077 |
| | | | 709/226 |
| 9,239,996 B2 * | 1/2016 | Moorthi | G06Q 10/06 |

(Continued)

FOREIGN PATENT DOCUMENTS

| AU | 2019332682 B2 * | 3/2021 | G06F 15/18 |
| EP | 3974980 A1 * | 3/2022 | H04L 41/0806 |

(Continued)

OTHER PUBLICATIONS

Derakhshan, Behrouz, et al. "Optimizing machine learning workloads in collaborative environments." Proceedings of the 2020 ACM SIGMOD International Conference on Management of Data. 2020. (Year: 2020).*

(Continued)

*Primary Examiner* — Timothy Padot
*Assistant Examiner* — Derick J Holzmacher
(74) *Attorney, Agent, or Firm* — Kunzler Bean & Adamson; Bruce R. Needham

(57) ABSTRACT

An apparatus for a license orchestrator to most efficiently distribute fee-based licenses includes a processor and a memory that stores code executable by the processor to determine that a workload is scheduled to be executed by a computing device. The computing device includes a licensable resource available for execution of the workload. The code is executable to compare a per-use licensing cost associated with using the licensable resource for execution of the workload with a cost of using existing capabilities of the computing device for execution of the workload and license and use the licensable resource for execution of the workload in response to determining that the per-use licensing cost of the licensable resource is less than using the existing capabilities of the computing device.

13 Claims, 5 Drawing Sheets

(51) Int. Cl.
  *G06F 9/50* (2006.01)
  *G06Q 20/12* (2012.01)
  *G06Q 10/0631* (2023.01)

(56) References Cited

U.S. PATENT DOCUMENTS

| | | | | |
|---|---|---|---|---|
| 9,680,657 | B2* | 6/2017 | Spicer | H04L 12/1435 |
| 9,684,542 | B2* | 6/2017 | Franco | H04L 67/1097 |
| 10,026,070 | B2* | 7/2018 | Thorpe | G06F 11/3409 |
| 10,171,565 | B2* | 1/2019 | Moon | G06F 11/34 |
| 10,474,559 | B2* | 11/2019 | Moorthi | G06F 8/71 |
| 10,592,825 | B2* | 3/2020 | Garg | G06Q 10/00 |
| 10,671,953 | B1* | 6/2020 | Xu | H04L 67/10 |
| 10,701,141 | B2* | 6/2020 | Salapura | G06F 9/45558 |
| 10,936,976 | B2* | 3/2021 | Ginis | G06Q 10/0637 |
| 11,245,640 | B1* | 2/2022 | Maurya | G06K 9/6262 |
| 11,470,144 | B1* | 10/2022 | Maurya | H04L 43/08 |
| 2007/0106622 | A1* | 5/2007 | Boomershine | G06Q 10/06 705/400 |
| 2009/0299791 | A1* | 12/2009 | Blake | G06Q 10/06 705/40 |
| 2011/0040703 | A1* | 2/2011 | Iqbal | G06Q 30/0283 705/400 |
| 2012/0296852 | A1* | 11/2012 | Gmach | G06Q 10/06 705/400 |
| 2013/0042003 | A1* | 2/2013 | Franco | G06Q 10/0633 709/226 |
| 2014/0278623 | A1* | 9/2014 | Martinez | G06Q 10/06 705/7.12 |
| 2015/0095089 | A1* | 4/2015 | Ginis | G06Q 10/06 705/7.22 |
| 2016/0142261 | A1* | 5/2016 | Huang | G06F 9/5072 709/223 |
| 2017/0052814 | A1* | 2/2017 | Aguiar | G06F 11/3442 |
| 2017/0063561 | A1* | 3/2017 | Spicer | G06F 9/505 |
| 2017/0111289 | A1* | 4/2017 | Cropper | H04M 15/80 |
| 2018/0007127 | A1* | 1/2018 | Salapura | H04L 47/783 |
| 2018/0081726 | A1* | 3/2018 | Ginis | G06F 11/3414 |
| 2018/0321928 | A1* | 11/2018 | Borthakur | G06F 21/105 |
| 2020/0073717 | A1* | 3/2020 | Hari | G06Q 30/0201 |
| 2020/0089515 | A1* | 3/2020 | Hari | H04L 41/5029 |
| 2020/0097348 | A1* | 3/2020 | Mahindru | G06F 11/008 |
| 2020/0142735 | A1* | 5/2020 | Maciocco | G06F 9/5038 |
| 2020/0159981 | A1* | 5/2020 | DiCorpo | G06F 30/3323 |
| 2020/0167196 | A1* | 5/2020 | Smith | H04L 9/0637 |
| 2020/0310847 | A1* | 10/2020 | Schulze | H04L 67/10 |
| 2021/0014114 | A1* | 1/2021 | Doshi | H04L 41/5019 |
| 2021/0125128 | A1* | 4/2021 | Martin | G06Q 30/0283 |
| 2021/0349734 | A1* | 11/2021 | Novales | G06F 9/4411 |

FOREIGN PATENT DOCUMENTS

| | | | | |
|---|---|---|---|---|
| WO | WO-2008121477 | A1 * | 10/2008 | G06F 21/105 |
| WO | WO-2012027478 | A1 * | 3/2012 | G06F 9/5061 |
| WO | WO-2013078269 | A1 * | 5/2013 | G06F 11/3664 |
| WO | WO-2016176414 | A1 * | 11/2016 | G06F 11/3409 |

OTHER PUBLICATIONS

Prabhakaran, Akhila, and J. Lakshmi. "Cost-benefit Analysis of Public Clouds for offloading in-house HPC Jobs." 2018 IEEE 11th International Conference on Cloud Computing (CLOUD). IEEE, 2018. (Year: 2018).*

Li, Chunlin, et al. "Cost-aware automatic scaling and workload-aware replica management for edge-cloud environment." Journal of Network and Computer Applications 180 (2021): 103017. (Year: 2021).*

Arnold, William C., et al. "Workload orchestration and optimization for software defined environments." IBM Journal of Research and Development 58.2/3 (2014): 11-1. (Year: 2014).*

Narayanan, Deepak, et al. "{Heterogeneity-Aware} Cluster Scheduling Policies for Deep Learning Workloads." 14th USENIX Symposium on Operating Systems Design and Implementation (OSDI 20). 2020. (Year: 2020).*

* cited by examiner

LICENSE ORCHESTRATOR TO MOST EFFICIENTLY DISTRIBUTE FEE-BASED LICENSES

FIELD

The subject matter disclosed herein relates to distribution of fee-based licenses and more particularly relates to a license orchestrator to most efficiently distribute fee-based licenses.

BACKGROUND

In the popular 'edge' use scenario, normally there are a number of remote locations that each have a number of systems, which need to be managed by a local manager, as well as being rolled up to a central manager. It is typical that the central manager and local manager are multi-tenant systems, and each edge node could run workload with licensed privilege. Under such circumstances, normally a problem is that workload placement algorithms fail to factor the possible effects of activation of a licensed acceleration function. This problem is amplified in situations where they are optimizing for a single tenant's SLA in a multi-tenant system.

One common licensing technique in use today is use a flat license scheme where a licensable resource is licensed for continual use regardless of how often the licensable resource is being used. This flat license is costly because licenses are in place and paid for even when the licensable resource is not being used.

Another common licensing technique is a per use licensing method where a license is good for some number of invocations, some amount of compute capacity, some amount of execution time, etc. and every time a workload utilizes a license for the licensable resource a counter runs and when the counter exceeds a threshold the license expires and the license must be renewed to be able to use the licensable resource. This method is also inefficient and costly.

A third licensing model that is commonly used is a floating licensing scheme where a central authority maintains a finite pool of licenses for a group of licensable resources where the number of licensable resources in the group exceeds the number of license in the pool. The licenses from the pool are assigned as needed, but licensable resources are not available if the maximum number of floating licenses have already been assigned, so inefficiencies remain.

BRIEF SUMMARY

An apparatus for a license orchestrator to most efficiently distribute fee-based licenses is disclosed. A method and computer program product also perform the functions of the apparatus. The apparatus includes a processor and a memory that stores code executable by the processor to determine that a workload is scheduled to be executed by a computing device. The computing device includes a licensable resource available for execution of the workload. The code is executable to compare a per-use licensing cost associated with using the licensable resource for execution of the workload with a cost of using existing capabilities of the computing device for execution of the workload and license and use the licensable resource for execution of the workload in response to determining that the per-use licensing cost of the licensable resource is less than using the existing capabilities of the computing device.

A method for a license orchestrator to most efficiently distribute fee-based licenses includes determining that a workload is scheduled to be executed by a computing device. The computing device includes a licensable resource available for execution of the workload. The method includes comparing a per-use licensing cost associated with using the licensable resource for execution of the workload with a cost of using existing capabilities of the computing device for execution of the workload, and licensing and using the licensable resource for execution of the workload in response to determining that the per-use licensing cost of the licensable resource is less than using the existing capabilities of the computing device.

A program product includes a computer readable storage medium that includes program code for a license orchestrator to most efficiently distribute fee-based licenses. The program code is configured to be executable by a processor to perform operations that include determining that a workload is scheduled to be executed by a computing device. The computing device includes a licensable resource available for execution of the workload. The program code is configured to be executable by a processor to perform operations that include comparing a per-use licensing cost associated with using the licensable resource for execution of the workload with a cost of using existing capabilities of the computing device for execution of the workload, and licensing and using the licensable resource for execution of the workload in response to determining that the per-use licensing cost of the licensable resource is less than using the existing capabilities of the computing device.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
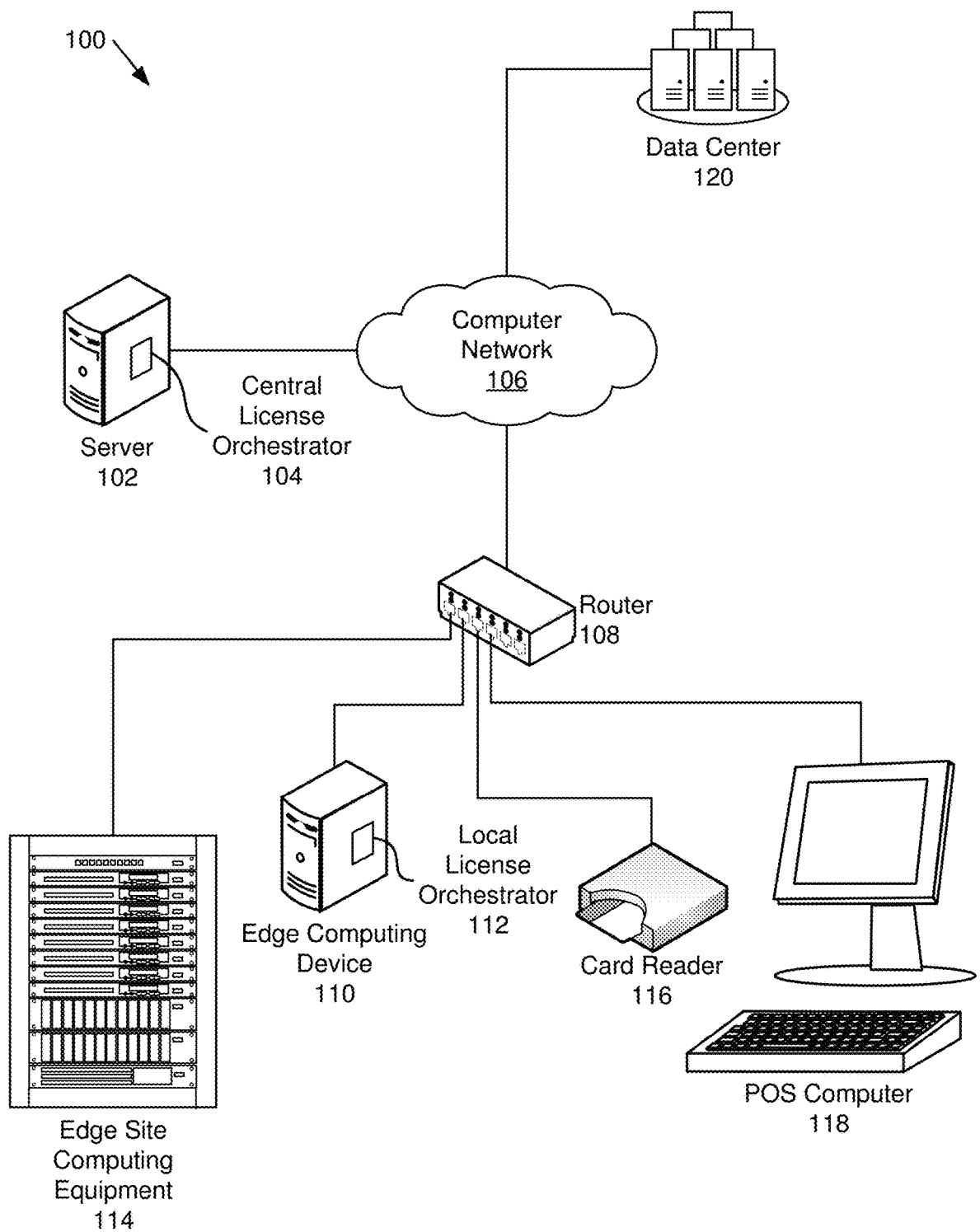
FIG. 1 is a schematic block diagram illustrating one embodiment of a system for a license orchestrator to most efficiently distribute fee-based licenses.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled or embodied as modules, in order to more particularly emphasize their implementation independence. For example, a module may be implemented as a hardware circuit comprising custom very large scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, R, Java, Java Script, Smalltalk, C++, C sharp, Lisp, Clojure, PHP, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The embodiments may transmit data between electronic devices. The embodiments may further convert the data from a first format to a second format, including converting the data from a non-standard format to a standard format and/or converting the data from the standard format to a non-standard format. The embodiments may modify, update, and/or process the data. The embodiments may store the received, converted, modified, updated, and/or processed data. The embodiments may provide remote access to the data including the updated data. The embodiments may make the data and/or updated data available in real time. The embodiments may generate and transmit a message based on the data and/or updated data in real time.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

An apparatus for a license orchestrator to most efficiently distribute fee-based licenses is disclosed. A method and computer program product also perform the functions of the apparatus. The apparatus includes a processor and a memory that stores code executable by the processor to determine that a workload is scheduled to be executed by a computing device. The computing device includes a licensable resource available for execution of the workload. The code is executable to compare a per-use licensing cost associated with using the licensable resource for execution of the workload with a cost of using existing capabilities of the computing device for execution of the workload and license and use the licensable resource for execution of the workload in response to determining that the per-use licensing cost of the licensable resource is less than using the existing capabilities of the computing device.

In some embodiments, the code is further executable by the processor to determine a per-use licensing cost by using workload analytics from one or more computing devices to build a use history of workloads similar to or the same as the workload scheduled to be executed by the computing device. In other embodiments, the code is further executable by the processor to use machine learning to build the use history. In other embodiments, the code is further executable by the processor to determine if a license for the licensable resource is available from a pool of licenses in response to determining that the workload is scheduled to be executed by the computing device.

In some embodiments, the per-use licensing cost includes the cost of the license. In other embodiments, the code is further executable by the processor to use the existing capabilities of the computing device to execute the workload without licensing the licensable resource in response to determining that using the existing capabilities of the computing device is less than the per-use licensing cost. In other embodiments, the licensable resource includes a hardware resource. In further embodiments, the licensable resource includes one or more ports of a network switch, a graphical processing unit ("GPU"), an accelerator, an additional CPU, a field programmable gate array ("FPGA") and/or remote access of a baseboard management controller ("BMC").

In some embodiments, the licensable resource comprises a software feature of an application. In other embodiments, the computing device is an edge computing device and/or a computing device at a location of the edge computing device and the license is available from a remote license orchestrator. In further embodiments, the code executable by the processor to determine that the workload is scheduled to be executed by the computing device, compare the per-use licensing cost with the cost of using the existing capabilities of the computing device, and license and use the licensable resource is located in memory of the edge computing device.

A method for a license orchestrator to most efficiently distribute fee-based licenses includes determining that a workload is scheduled to be executed by a computing device. The computing device includes a licensable resource available for execution of the workload. The method includes comparing a per-use licensing cost associated with using the licensable resource for execution of the workload with a cost of using existing capabilities of the computing device for execution of the workload, and licensing and using the licensable resource for execution of the workload in response to determining that the per-use licensing cost of the licensable resource is less than using the existing capabilities of the computing device.

In some embodiments, the method includes determining a per-use licensing cost by using workload analytics from one or more computing devices to build a use history of workloads similar to or the same as the workload scheduled to be executed by the computing device. In other embodiments, the method includes determining if a license for the licensable resource is available from a pool of licenses in response to determining that the workload is scheduled to be executed by the computing device. In other embodiments, the method includes using the existing capabilities of the computing device to execute the workload without licensing the licensable resource in response to determining that using the existing capabilities of the computing device is less than the per-use licensing cost. In other embodiments, the licensable resource includes a hardware resource and/or a software resource.

A program product includes a computer readable storage medium that includes program code for a license orchestrator to most efficiently distribute fee-based licenses. The program code is configured to be executable by a processor to perform operations that include determining that a workload is scheduled to be executed by a computing device. The computing device includes a licensable resource available for execution of the workload. The program code is configured to be executable by a processor to perform operations that include comparing a per-use licensing cost associated with using the licensable resource for execution of the workload with a cost of using existing capabilities of the computing device for execution of the workload, and licensing and using the licensable resource for execution of the workload in response to determining that the per-use licensing cost of the licensable resource is less than using the existing capabilities of the computing device.

In some embodiments, the code is further configured to be executable by a processor to perform operations that include determining a per-use licensing cost by using workload analytics from one or more computing devices to build a use history of workloads similar to or the same as the workload scheduled to be executed by the computing device. In other embodiments, the code is further configured to be executable by a processor to perform operations that include determining if a license for the licensable resource is available from a pool of licenses in response to determining that the workload is scheduled to be executed by the computing device. In other embodiments, the code is further configured to be executable by a processor to perform operations that include using the existing capabilities of the computing device to execute the workload without licensing the licensable resource in response to determining that using the existing capabilities of the computing device is less than the per-use licensing cost.

FIG. 1 is a schematic block diagram illustrating one embodiment of a system 100 for a license orchestrator to most efficiently distribute fee-based licenses. The system 100 includes a server 102, a central license orchestrator 104, a computer network 106, a router 108, an edge computing device 110, a local license orchestrator 112, edge site computing equipment 114, a card reader 116, a point-of-sale ("POS") computer 118 and a data center 120, which are described below.

The system 100 includes a server 102 that includes a central license orchestrator 104 that manages of fee-based licenses for computing equipment. The licenses are for unlocking access to additional capabilities for the computing equipment. The licenses may be for hardware components or software capabilities. For example, a computing device may include one or more accelerators that are installed in a computing device but are not being used by the computing device because the computing device is not licensed to use the accelerators. Once the central or local license orchestrator 104, 112 conveys a license to the computing device, the computing device is able to use one of the accelerators in processing a workload. In other embodiments, the central license orchestrator 104 conveys a license to the computing device to unlock a software function for processing a workload.

The per-use licenses are conveyed for a particular use, workload, or the like where an owner or lessee of the computing device is charged for use of the license and at the end of the use the owner or lessee surrenders the license after completion of the workload, use, etc. The per-use licenses in the embodiments described herein differ from other per-use licenses that expire after a certain time limit, execution cycles, amount of time, etc. The per-use licenses also differ from floating licenses where there is a particular number of licenses in a pool and a floating license is checked out, which decreases the number of available licenses and a computing device with a floating license uses the licensable resource until the floating license is returned. In addition, the per-use licenses also differ from fixed licenses that remain in place for a particular resource. In some embodiments, the per-use licenses are available as needed and can be removed when a task is done but also include some expiration mechanism that removes the license if not revoked at the time the task, workload, etc. is completed.

The central license orchestrator 104, in some embodiments, works with a local license orchestrator 112 in an edge computing device 110 to manage per-use licenses where the edge computing device 110 has compute capability to calculate when a per-use license is a more cost effective solution compared to existing capabilities of the edge computing device 110, edge side equipment, POS computer 118, etc.

The central license orchestrator 104 and/or local license orchestrator 112, in some embodiments work effectively in an edge computing environment. Edge computing is typically used where remote computing, such as cloud computing, is not an effective solution for servicing workloads. Often, edge computing equipment has licensable capabilities that are not active until needed. For example, a retailer may have numerous brick-and-mortar stores and a remote central facility that collects and analyzes data of the stores. Data is sent to the central facility on a periodic basis, but servicing workload needs at the retail stores requires on site computing resources because sending workload data back and forth to the central facility would require too much network traffic. Often, edge computing is used for the retail stores where each store has edge site computing equipment 114 and may include a main edge computing device 110 to manage licensing needs.

The central and local license orchestrators 104, 112 enable use of capabilities in computing equipment at edge sites by licensing various components or software on an as-needed basis. Often edge computing equipment (e.g. 110, 114, 118) include components shipped with the computing equipment and configured to be used but that are not active without a license. For example, a computing device may include a graphical processing unit ("GPU"), accelerator, additional cores, a field-programmable gate array ("FPGA"), network ports, etc. that can be activated with a license as needed to increase computing capabilities at the edge site. The computing equipment at an edge site may also include software features that are activated by a license that increase compute capabilities of the computing equipment. For example, licensable resources that are software may include a software library, a function of an application, remote access to a monitoring program on a baseboard management controller ("BMC"), or the like. Likewise, a data center 120 may also include computing devices with licensable resources capable of benefiting from the embodiments described herein.

An edge computing situation where the embodiments described herein may be applicable is an airport security system using facial recognition. Some computing devices processing facial recognition workloads may include licensable resources, such as GPUs or special purpose FPGAs. While flight schedules are known, changes in weather, flight delays, number of passengers actually flying, etc. affect the number of travelers in an airport or a particular part of an airport in a random way. As travelers arrive from a flight or for boarding a flight, the number of travelers varies at particular locations where airport security cameras are analyzing facial features of the travelers to attempt to identify the travelers. Where an increase in travelers goes beyond existing capabilities of computing devices, a central or local license orchestrator 104, 112 may analyze workload needs and may license GPUs, FPGAs, etc. as needed to handle an increase in travelers at various locations.

Another edge computing situation where the embodiments described herein are applicable is cellular equipment servicing a subway system. Subways often require on site cellular equipment to cover underground subway routes. Computing needs servicing cell phones of subway riders vary as the subway cars move from station to station. While routes, subway schedules, etc. are known, subway riders may be using different capabilities depending on what is going on in the world on a particular day. For example, a relevant news story may include video which may increase video processing loads at a particular time. Embodiments described herein may activate additional GPU capabilities in cellular computing equipment through per-use licensing. Other relevant edge computing scenarios are described below.

The central license orchestrator 104 and/or local license orchestrator 112 work with a workload orchestrator or other resource capable of analyzing where, when and/or how a workload is to be executed. As used herein, a workload is a task, a set of computing instructions, computational tasks performed in a given period of time, etc. that can be executed by more than one resource or can benefit from an additional licensed software capability. A workload may be a memory workload, a central processing unit ("CPU") workload, an IO workload, a database workload, or the like. The central and/or local license orchestrators 104, 112 are capable of coordinating with a workload orchestrator to determine a most cost effective solution for execution of a workload considering costs of licensing and using a licensable resource of a computing device versus using existing capabilities of a computing device. The existing capabilities of a computing device are those resources available to the computing device for execution of the workload without use of an additional licensable resource by the computing device. The cost of licensing and using a licensable resource include the costs of paying a license fee. The central and/or local license orchestrators 104, 112 and/or workload orchestrator analyze workload needs to determine when use of a licensable resource is desirable.

The server 102, in some embodiments, is owned or controlled by a company that provides computing devices with licensable resources that are included in the computing devices but not usable without activation of a license. In other embodiments, the server 102 is controlled by an independent licensing authority different than a manufacturer of the computing devices. The server 102 communicates with the computing devices, for example the edge computing device 110, the edge site computing equipment 114, a card reader 116, a POS computer 118, a data center 120, a router 108, etc. over a computer network 106. The router 108 may merely direct network traffic or may also include a licensable resource, such as licensable ports.

The computer network 106 includes one or more network types, such as a wide area network ("WAN"), a fiber network, satellite network, a local area network ("LAN"), and the like. The computer network 106 may include two or more networks. The computer network 106 may include private networks or public networks, such as the Internet.

The wireless connection may be a mobile telephone network. The wireless connection may also employ a Wi-Fi network based on any one of the Institute of Electrical and Electronics Engineers ("IEEE") 802.11 standards. Alternatively, the wireless connection may be a BLUETOOTH® connection. In addition, the wireless connection may employ a Radio Frequency Identification ("RFID") communication including RFID standards established by the International Organization for Standardization (ISO), the International Electrotechnical Commission ("IEC"), the American Society for Testing and Materials® ("ASTM"®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification ("IrPHY") as defined by the Infrared Data Association® ("IrDA" ®). Alternatively, the wireless connection may be a cellular telephone network communication. All standards and/or connection types include the latest version and revision of the standard and/or connection type as of the filing date of this application. One of skill in the art will recognize other embodiments of the computer network 106 that enable communication between the computing devices with a licensable resource and the server 102 and/or the edge computing device 110 with central and local license orchestrators 104, 112.

The server 102 includes one or more processors and memory and other typical computing device elements, such as communication busses, a network interface card ("NIC"), input/output device connections, and the like. The server 102 includes a central licensing orchestrator 104 that manages license distribution to computing devices with a licensable resource. In some embodiments where the server 102 or other computing resources at the site of the server 102 include workload orchestration capabilities, the central license orchestrator 104 distributes licenses directly to the computing devices. In other embodiments, the edge site includes computing resources for the edge site computing equipment 114 and other equipment at the edge site (e.g. 110, 116, 118) and the local license orchestrator 112 distributes licenses to computing devices at the edge site. In some embodiments, the local license orchestrator 112 obtains a needed license or other license information from the central license orchestrator 104. In other embodiments, a computing device at a data center 120 includes a local license orchestrator 104 and distributes licenses to computing devices at the data center 120.

The router 108, in some embodiments, allows creation of a LAN at an edge site with an external connection to the server 102, a data center 120, the Internet, etc. The router 108 includes network ports for a LAN and one or more external ports for connection to an external network. In some embodiments, the router 108 includes an IP address and acts as a gateway for the LAN serving the edge site. In other embodiments, the router 108 includes a firewall. One of skill in the art will recognize other functions of a router 108.

The edge computing device 110 includes the local license orchestrator 112. While the edge computing device 110 is depicted as a stand-alone device, the edge computing device 110 may be located in a rack and may be included with the edge site computing equipment 114. The edge computing device 110 includes one or more processors and memory along with other components typical of a computing device. The edge computing device 110, in some embodiments, has access to information about licensable resources of the edge site computing equipment 114 and other computing devices (e.g. 116, 118) at the edge site (collectively "edge site computing equipment 114"). Thus, the local license orchestrator 112 has information about the licensable resources in the edge site computing equipment 114. In some examples, the edge computing device 110 and/or local license orchestrator 112 have information that one or more servers have one or more accelerators, GPUs, FPGAs, etc. that are inactive until licensed. In other examples, edge computing device 110 and/or local license orchestrator 112 have information that the router 118 has unused ports that are licensable resources.

In some embodiments, the edge computing device 110 includes a workload orchestrator that schedules workloads on the edge site computing equipment 114. The local license orchestrator 112 and/or the central license orchestrator 104 work with the workload orchestrator for a workload to compare a cost of licensing a licensable resource and using the licensable resource to execute the workload versus using existing resources to execute the workload. In some embodiments, the local license orchestrator 112 and/or the central license orchestrator 104 work with the workload orchestrator to recognize workload changes that would change computing resource needs.

In some examples, the local or central license orchestrators 112, 104 pause execution of a workload, perform a cost benefit analysis based on current workload needs, license a licensable resource if necessary based on the results of the cost benefit analysis, and then direct the workload orchestrator to execute the workload using a particular resource. Where the local license orchestrator 112 is in a data center 120, the data center 120 may include a workload orchestrator and the local and/or central license orchestrator 112, 104 work in conjunction with workload orchestrator to determine if licensing a licensable resource is a cost effective solution and then directing the workload orchestrator to execute the workload based on a cost benefit analysis.

The edge site computing equipment 114 includes one or more servers, data storage devices, switches, power supplies, etc. In some embodiments, some or all of the edge site computing equipment 114 is rack mounted. In other embodiments, some or all of the edge site computing equipment 114 is stand-alone. The edge site may include other equipment, such as card readers 116, POS computers 118, scanners, conveyor belts, security equipment, cameras, motor controllers, programmable controllers, safety devices, or any other equipment that produces data and includes an interface with other edge site computing equipment 114 and/or the edge computing device 110.

The data center 120 includes servers, data storage devices, switches, routers, power supplies and other equipment typically part of a data center 120. The data center 120, in some embodiments, is part of a cloud computing system. The data center 120 typically includes rack-mounted equipment but may also include other stand-alone equipment. The data center 120, in some embodiments, includes a local license orchestrator 112. In some embodiments, the data center 120 includes a central license orchestrator 104 and an edge computing device 110 includes a local license orchestrator 112. While embodiments described herein use examples of edge computing systems and data centers 120, the embodiments described herein are applicable to any system with computing devices with licensable resources that would benefit from analyzing per-use licensing costs versus using existing capabilities.

Figure 2:
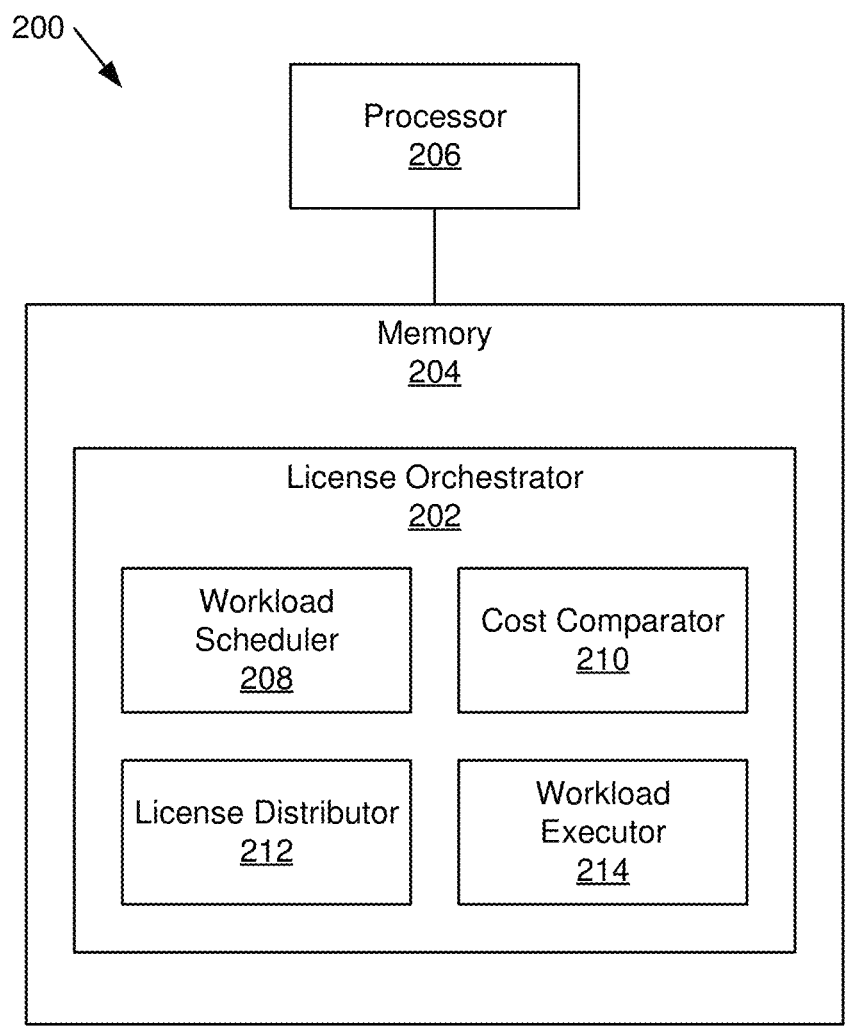
FIG. 2 is a schematic block diagram illustrating one embodiment of an apparatus for a license orchestrator to most efficiently distribute fee-based licenses.

FIG. 2 is a schematic block diagram illustrating one embodiment of an apparatus 200 for a license orchestrator to most efficiently distribute fee-based licenses. The apparatus 200 includes a license orchestrator 202 in memory 204 connected to a processor 206 where the license orchestrator 202 includes a workload scheduler 208, a cost comparator 210, a license distributor 212 and a workload executor 214, which are described in more detail below. In some embodiments, the license orchestrator 202 is implemented with computer readable program code stored on non-transitory computer readable storage media. In other embodiments, all or a portion of the license orchestrator 202 is implemented using an FPGA or other programmable hardware device. One of skill in the art will recognize other ways to implement a license orchestrator 202. In some embodiments, the workload scheduler 208, the cost comparator 210, the license distributor 212 and the workload executor 214 are modules as defined above.

The license orchestrator 202 in some embodiments, is a local license orchestrator 112. In other embodiments, the license orchestrator 202 is a central license orchestrator 104. In other embodiments, the license orchestrator 202 includes elements that are in both the central license orchestrator 104 and a local license orchestrator 112.

The license orchestrator 202 includes a workload scheduler 208 configured to determine that a workload is scheduled to be executed by a computing device. The computing device includes a licensable resource available for execution of the workload. The computing device includes any type of computing equipment that has a licensable resource. For example, the computing device may be part of the edge site computing equipment 114, the edge computing device 110, a POS computer 118, a card reader 116, the router 108 or any other computing device with a licensable resource. A computing device may include more than one licensable resource. Embodiments described herein in certain embodiments include licensing multiple licensable resources of a computing device.

The workload is a sequence of program code, an application, a sequence of instructions, or the like that can be scheduled. In some embodiments, a workload has a defined start and a defined end. In other embodiments, the workload has a starting point and runs until stopped. In other embodiments, the workload is an executable process that can be switched to execute on a licensable resource. In some embodiments, a workload include a portion of a workload that can be split out and executed on a licensable resource while other portions of the workload are executable elsewhere, such as on exiting capabilities of the computing device or another licensable resource on the computing device. One of skill in the art will recognize other embodiments of a workload that may be scheduled for execution on a licensable resource in a computing device or using existing capabilities of the computing device.

In some embodiments, the workload scheduler 208 determining that a workload is scheduled to be executed on a computing device includes the workload scheduler 208 determining that there is an increase or change in a workload pattern, which then triggers the cost comparator 210. In some embodiments, the workload scheduler 208 works in conjunction with a workload orchestrator to determine if a change in workload is enough to trigger the cost comparator 210. In other embodiments, the workload scheduler 208 is used for every workload and triggers the cost comparator 210 for all workloads.

In some embodiments, the workload scheduler 208 is part of the license orchestrator 202. In other embodiments, the workload scheduler 208 coordinates with a workload orchestrator to determine that a workload is scheduled to be executed on a computing device.

The license orchestrator 202 includes a cost comparator 210 configured to compare a per-use licensing cost associated with using the licensable resource of the computing device for execution of the workload with a cost of using existing capabilities of the computing device for execution of the workload. The cost comparator 210, in some embodiments, monetizes execution of the workload. In some examples, an amount of time for execution of the workload may correlate to productivity which can be monetized.

For example, a workload may take 10 minutes to execute with existing capabilities of the computing device, which may cost $100. In the example, the licensable resource may be an accelerator in the computing device that executes the workload 2 times faster than the existing capabilities of the computing device, such as a CPU. Execution of the workload using the accelerator may then take 5 minute at a productivity cost of $50. However, getting a license to use the accelerator may cost $60 so that the cost comparator 210 determines that the cost of using the accelerator for the workload is $110 but the cost of using the existing capabilities of the computing device is then $100 so the cost comparator 210 determines that use of existing capabilities is cheaper than licensing an accelerator to execute the workload. In a related example, the cost of using the existing capabilities of the computing device may be $150 so the cost comparator 210 determines that the cost of using the accelerator and the cost of the license is $110, which is less than using existing capabilities of the computing device to execute the workload.

Productivity costs, in some examples, vary based on numerous factors, such as time of day, the number of customers in checkout lines in a store, amount of network traffic, etc. In other embodiments, cost of the license varies based on various factors, such as time of day, number of remaining licenses, type of licensable resource, and the like. In some embodiments, the cost comparator 210 has access to data indicating customer demand, changing productivity costs, time of day, number of travelers moving toward facial recognition cameras, hours of operation of a store, number of customers viewing video content, and other data that helps determine costs of using licensed resources and costs of using existing capabilities.

While the embodiments described above are for a single comparison of the costs of using a licensed resource versus the costs of using existing capabilities of a computing device, in other embodiments, the cost comparator 210 is capable of evaluating costs of licensing and using multiple licensable resources of the computing device and comparing various combinations of licensable resources and existing capabilities of the computing device.

In other embodiments, the cost comparator 210 is capable of determining the cost of licensing and using more than one licensable resource and comparing the cost of using existing capabilities versus the various costs of licensing and using the licensable resources. For example, a computing device may include a GPU and an accelerator, which are both licensable resources. In the example, the cost comparator 210 compares the cost of using the existing CPU of the computing device for execution of a workload against the costs of licensing and using the GPU and licensing and using the accelerator.

In other embodiments, the type of workload is used to determine costs for execution of the workload. In other embodiments, the cost comparator 210 compares cost valued in something other than some type of currency. For example, the cost comparator 210 may compare some arbitrary or known unit. One of skill in the art will recognize other ways for the cost comparator 210 to compare a per-use licensing cost associated with using the licensable resource for execution of the workload with a cost of using existing capabilities of the computing device for execution of the workload.

The license orchestrator 202 includes a license distributor 212 configured to license a licensable resource of the computing device in response to determining that the per-use cost of licensable resource is less than using the existing capabilities of the computing device. In some embodiments, the license distributor 212 is in the central license orchestrator 104 that is capable of issuing and controlling licenses to licensable resources of the computing device. Where the central license orchestrator licenses the licensable resource of the computing device, in some embodiments, the license distributor 212 communicates with the computing device directly. Where the central license orchestrator 104 licenses the licensable resource of the computing device, in other embodiments, the central license orchestrator 104 works with a local license orchestrator 112 to communicate with the computing device. In other embodiments, the license distributor 212 is in a local license orchestrator 112 that licenses the licensable resource of the computing device.

Where the license distributor 212 is in a local license orchestrator 112, the license distributor 212 communicates with the central license orchestrator 104 to obtain license information and/or a license.

In some embodiments, the license distributor 212 licenses more than one licensable resource for execution of a workload. For example, the workload may be broken into multiple parts to be executed on the multiple licensable resources. For example, the computing device may include two accelerators and the workload is capable of being split between the two accelerators so the license distributor 212 licenses both accelerators in response to the cost comparator 210 determining that licensing and using both accelerators is more cost effective than using existing capabilities of the computing device, using just one accelerator or using existing capabilities of the computing device along with one accelerator.

In some embodiments, the license distributor 212 automatically licenses the licensable resource of the computing device without any user input. In other embodiments, the license distributor 212 licenses the licensable resource after some type of user input, such as receiving approval from a user to license the licensable resource. In the embodiment, the license distributor 212 or other component of the license orchestrator 202 notifies the user prior to receiving approval from the user to license the licensable resource. For example, the license distributor 212 or other component may inform the user that licensing the licensable resource is cheaper than using existing capabilities of the computing device.

In some embodiments, the license distributor 212 licenses the licensable resource of the computing device by interacting with the computing device to authorize use of the licensable resource so that an operating system of the computing device will recognize that the licensable resource is available for execution of workloads. In other embodiments, the license distributor 212 imposes one or more limits on the license. For example, the license distributor 212 may impose a limit that the computing device is only authorized to use the licensable resource until completion of execution of the workload or a similar trigger that revokes the license of the licensable resource. In other embodiments, the license distributor 212 continues to maintain the license of the licensable resource until completion of execution of the workload and then waits for additional results from the cost comparator 210 before revoking or maintaining the license of the licensable resource. One of skill in the art will recognize other ways for the license distributor 212 to license and/or maintain a license of a licensable resource of the computing device.

The license orchestrator 202 includes a workload executor 214 configured to use the licensable resource for execution of the workload. In some embodiments, the workload executor 214 directs the computing device to use the licensable resource to execute the workload in response to the license distributor 212 licensing the licensable resource. In other embodiments, the workload executor 214 coordinates with a workload orchestrator and the workload orchestrator directs the computing device to use the licensable resource for execution of the workload. In response to direction from the workload executor 214 and/or the workload orchestrator, the computing device submits the workload to the licensable resource for execution.

In some embodiments, the workload executor 214 is configured to use the existing capabilities of the computing device to execute the workload without the license distributor 212 licensing the licensable resource in response to determining that using the existing capabilities of the computing device is less than the per-use licensing cost and associated execution of the workload. In some embodiments, the workload executor 214 is configured to direct the computing device to execute the workload using existing capabilities. In other embodiments, the workload executor 214 coordinates with the workload orchestrator to direct the computing device to execute the workload using existing capabilities.

Figure 3:
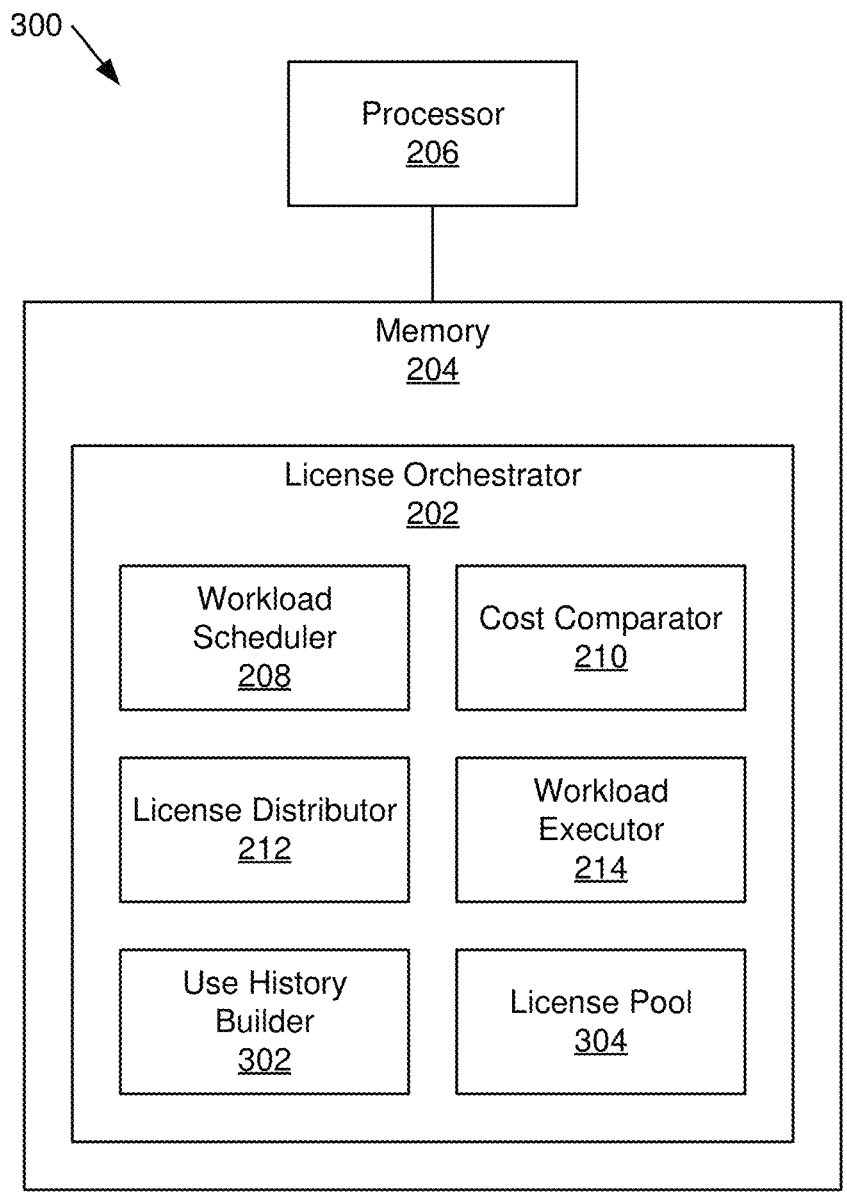
FIG. 3 is a schematic block diagram illustrating another embodiment of an apparatus for a license orchestrator to most efficiently distribute fee-based licenses.

FIG. 3 is a schematic block diagram illustrating another embodiment of an apparatus 300 for a license orchestrator to most efficiently distribute fee-based licenses. The apparatus 300 includes another embodiment of the license orchestrator 202 in memory 204 connected to a processor 206 where the license orchestrator 202 includes a workload scheduler 208, a cost comparator 210, a license distributor 212 and a workload executor 214, which are substantially similar to those described above in relation to the apparatus 200 of FIG. 2. The apparatus 300 includes, in various embodiments, a use history builder 302 and/or a license pool 304, which are describes in more detail below. In some embodiments, the license orchestrator 202 is at least partially implemented with computer readable program code stored on non-transitory computer readable storage media. In other embodiments, the license orchestrator 202 is at least partially implemented using an FPGA or other programmable hardware device. One of skill in the art will recognize other ways to implement a license orchestrator 202. In some embodiments, the workload scheduler 208, the cost comparator 210, the license distributor 212, the workload executor 214 and/or the use history builder 302 are modules as defined above.

The license orchestrator 202 in some embodiments, is a local license orchestrator 112. In other embodiments, the license orchestrator 202 is a central license orchestrator 104. In other embodiments, the license orchestrator 202 includes elements that are in both the central license orchestrator 104 and a local license orchestrator 112.

In some embodiments, the license orchestrator 202 includes a use history builder 302 configured to determine a per-use licensing cost by using workload analytics from one or more computing devices to build a use history of workloads similar to or the same as the workload scheduled to be executed by the computing device. The use history, in various embodiments, is a data structure of some type, such as a database, a list, a table or the like accessible to the license orchestrator 202. In some embodiments, use history builder 302 distinguishes between various licensable resources of the computing devices and existing capabilities of the computing devices to create a use history for a workload or similar workloads executed in different ways.

For example, if various computing devices that are similar to the computing device described above include licensable resources that include a GPU and an accelerator in addition to being able to execute a workload on the CPU of the computing devices and the workload or similar workloads are executed on the various computing devices using a GPU in some instances, using an accelerator in some instance and using the CPU of the computing devices in some instances, the use history builder 302, in a use history, stores cost data, execution data, information about which device executed the workload, information about costs caused by slow or fast execution and other useful information.

In some embodiments, the use history builder 302 or the use history directly receives information from a user, such as estimated business loss caused by slow execution and the like. In other embodiments, the use history builder 302 includes algorithms, data, etc. related to business impacts from fast and/or slow execution of the workloads. The cost comparator 210 then uses information from the use history to compare a per-use licensing cost associated with using the licensable resource for execution of the workload with a cost of using existing capabilities of the computing device for execution of the workload. In some embodiments, the use history is located at the central license orchestrator 104. In other embodiments, the use history is stored in another location accessible to the central and/or local license orchestrators 104, 112.

In some embodiments, the use history builder 302 is configured to use machine learning to build the use history. In some examples, the use history builder 302 uses machine learning to refine cost data based on various conditions, such as number of people in a store, airport, etc. during execution of the workloads using various licensable resources and existing capabilities. In some embodiments, the use history builder 302 uses a training phase to populate the use history, refine results of the use history, etc. In other embodiments, the use history includes training data in a training phase. The training data may include prepopulated data input by a user, received from another source, etc. to train the use history builder 302 and then the use history builder 302 uses subsequent workload execution data to refine costs the use history. In some embodiments, the use history builder 302 uses a neural network to implement the machine learning. In other embodiments, the use history builder 302 uses input from a user or other source as part of the machine learning. For example, the use history builder 302 may use financial data, sales data, etc. correlated with execution results in the machine learning process. One of skill in the art will recognize other ways for the use history builder 302 to use machine learning to improve the use history.

In some embodiments, the license orchestrator 202 includes a license pool 304 and the license distributor 212 is configured to determine if a license for the licensable resource is available from the license pool 304 in response to determining that the workload is scheduled to be executed by the computing device. The license pool 304, in some embodiments, has a finite number of licenses for a licensable resource so that the workload executor 214 would use existing capabilities of the computing device if a license for the licensable resource was not available from the license pool 304 after the cost comparator 210 has determined that the per-use licensing cost using the licensable resource on the computing device is less than using existing capabilities of the computing device. In some embodiments, the license pool 304 is at the central license orchestrator 104. In other embodiments, a local license orchestrator 112 includes a license pool 304 with at least some of a total number of licenses for the licensable resource. In other embodiments, the license orchestrator 202 has access to an unlimited number of licenses for the licensable resource of a computing device.

Figure 4:
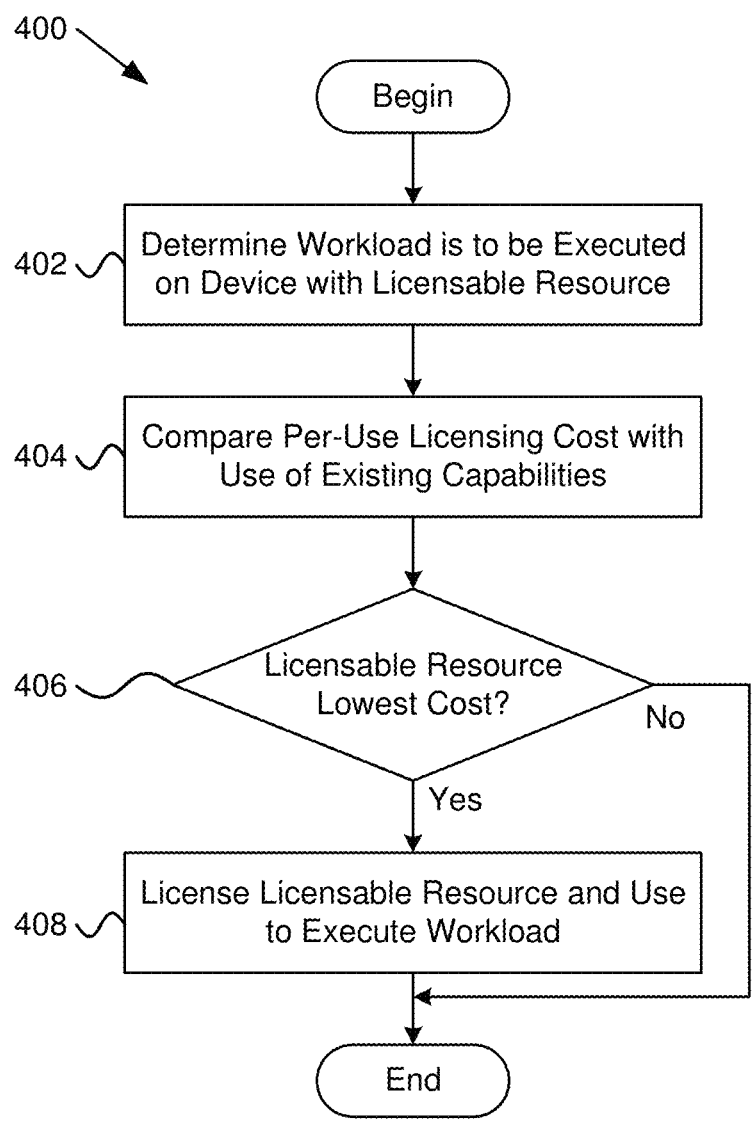
FIG. 4 is a schematic flow chart diagram illustrating one embodiment of a method for a license orchestrator to most efficiently distribute fee-based licenses.

FIG. 4 is a schematic flow chart diagram illustrating one embodiment of a method 400 for a license orchestrator to most efficiently distribute fee-based licenses. The method 400 begins and determines 402 that a workload is scheduled to be executed by a computing device. The computing device includes a licensable resource available for execution of the workload. The method 400 compares 404 a per-use licensing cost associated with using the licensable resource for execution of the workload with a cost of using existing capabilities of the computing device for execution of the workload.

The method 400 determines 406 if the per-use licensing cost associated with using the licensable resource for execution of the workload is lower than the cost of using existing capabilities of the computing device for execution of the workload. If the method 400 determines 406 that the per-use licensing cost associated with using the licensable resource for execution of the workload is not lower than the cost of using existing capabilities of the computing device for execution of the workload, the computing device would execute the workload using existing capabilities and the method 400 ends. If the method 400 determines 406 that the per-use licensing cost associated with using the licensable resource for execution of the workload is lower than the cost of using existing capabilities of the computing device for execution of the workload, the method 400 licenses 408 and uses the licensable resource for execution of the workload, and the method 400 ends. In various embodiments, the method 400 is wholly or partially implemented using the workload scheduler 208, the cost comparator 210, the license distributor 212 and/or the workload executor 214.

Figure 5:
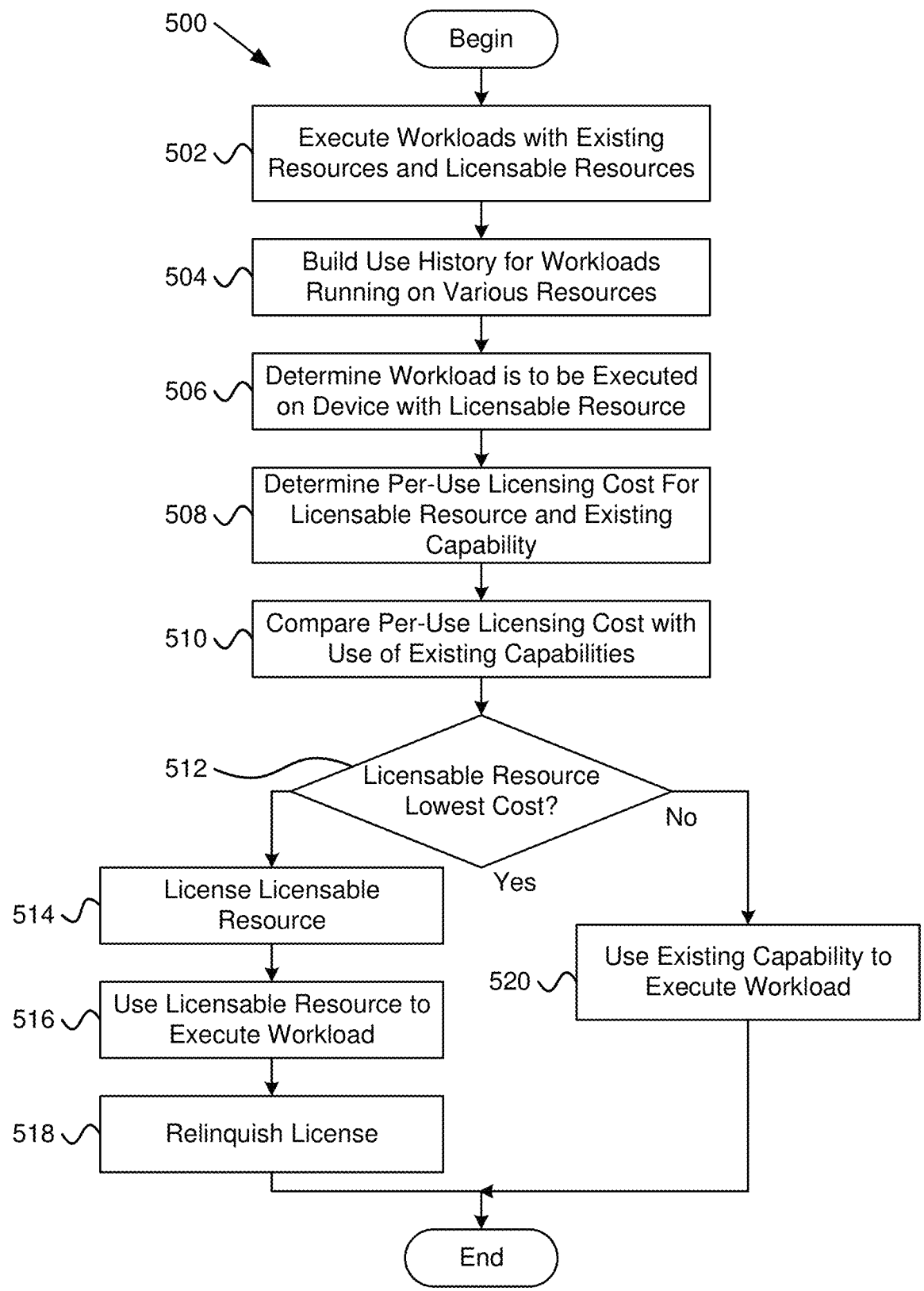
FIG. 5 is a schematic flow chart diagram illustrating another embodiment of a method for a license orchestrator to most efficiently distribute fee-based licenses.

FIG. 5 is a schematic flow chart diagram illustrating another embodiment of a method 500 for a license orchestrator to most efficiently distribute fee-based licenses. The method 500 begins and executes 502 workloads with existing capabilities and licensable resources of one or more computing devices and builds 504 a use history for the executed workloads which are similar to or the same as the workload to be executed by a computing device scheduled to execute a workload.

The method 500 determines 506 that a workload is scheduled to be executed by the computing device. The computing device includes a licensable resource available for execution of the workload. The method 500 determines 508 a per-use licensing cost associated with using the licensable resource for execution of the workload and determines 508 a cost of using existing capabilities of the computing device for execution of the workload using the use history and then compares 510 the per-use licensing cost associated with using the licensable resource for execution of the workload with the cost of using existing capabilities of the computing device for execution of the workload.

The method 500 determines 512 if the per-use licensing cost associated with using the licensable resource for execution of the workload is lower than the cost of using existing capabilities of the computing device for execution of the workload. If the method 500 determines 512 that the per-use licensing cost associated with using the licensable resource for execution of the workload is lower than the cost of using existing capabilities of the computing device for execution of the workload, the method 500 licenses 514 the licensable resource and uses 516 the licensable resource to execute the workload. The method 500 relinquishes 518 the license once execution of the workload is complete, and the method 500 ends.

If the method 500 determines 512 that the per-use licensing cost associated with using the licensable resource for execution of the workload is not lower than the cost of using existing capabilities of the computing device for execution of the workload, the method 500 uses 520 existing capabilities of the computing device to execute the workload, and the method 500 ends. In various embodiments, the method 500 is wholly or partially implemented using the workload scheduler 208, the cost comparator 210, the license distributor 212, the workload executor 214, the use history builder 302 and/or the license pool 304.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a processor; and
a memory that stores code executable by the processor to:
train a neural network using machine learning during a training phase to build a use history the use history comprising a per-use licensing cost of one or more licensable resources available to one or more computing devices and a cost of using existing capabilities of the one or more computing devices, the neural network using workload analytics from the one or more computing devices to build the use history of workloads comparable to a workload scheduled to be executed by a computing device of the one or more computing devices;
determine, using a workload scheduler, that the workload is scheduled to be executed by the computing device, the computing device comprising a licensable resource available for execution of the workload at a time the workload is scheduled for execution;
compare, using a cost comparator, a per-use licensing cost associated with using the licensable resource for execution of the workload with a cost of using existing capabilities of the computing device for execution of the workload, wherein the per-use licensing cost comprises a monetary cost of the per-use license at the time of execution of the workload plus a monetized cost associated with execution of the workload on the licensable resource at the time of execution of the workload and the cost of using existing capabilities comprises a monetized cost associated with execution of the workload with the existing capabilities at the time of execution of the workload;
automatically license, using a license distributor, the licensable resource without user input and use the licensable resource for a duration of execution of the workload, using a workload executor, at the scheduled time in response to determining that, at the time the workload is scheduled for execution, the per-use licensing cost of the licensable resource is less than using the existing capabilities of the computing device; and
use the existing capabilities of the computing device to execute the workload, using the workload executor, at the scheduled time without licensing the licensable resource in response to determining that, at the time the workload is scheduled for execution, using the existing capabilities of the computing device is less than the per-use licensing cost.

2. The apparatus of claim 1, wherein the code is further executable by the processor to determine if a license for the licensable resource is available from a pool of licenses in response to determining that the workload is scheduled to be executed by the computing device.

3. The apparatus of claim 1, wherein the per-use licensing cost includes the cost of the license.

4. The apparatus of claim 1, wherein the licensable resource comprises a hardware resource.

5. The apparatus of claim 4, wherein the licensable resource comprises one or more ports of a network switch, a graphical processing unit ("GPU"), an accelerator, an additional CPU, a field programmable gate array ("FPGA"), and/or remote access of a baseboard management controller ("BMC").

6. The apparatus of claim 1, wherein the licensable resource comprises a software feature of an application.

7. The apparatus of claim 1, wherein the computing device is an edge computing device and/or a computing device at a location of the edge computing device and the license is available from a remote license orchestrator.

8. The apparatus of claim 7, wherein the code executable by the processor to determine that the workload is scheduled to be executed by the computing device, compare the per-use licensing cost with the cost of using the existing capabilities of the computing device, and license and use the licensable resource is located in memory of the edge computing device.

9. A method comprising:
training a neural network using machine learning during a training phase to build a use history the use history comprising a per-use licensing cost of one or more licensable resources available to one or more computing devices and a cost of using existing capabilities of the one or more computing devices, the neural network using workload analytics from the one or more computing devices to build the use history of workloads comparable to a workload scheduled to be executed by a computing device of the one or more computing devices;
determining, using a workload scheduler, that the workload is scheduled to be executed by the computing device, the computing device comprising a licensable resource available for execution of the workload at a time the workload is scheduled for execution;
comparing, using a cost comparator, a per-use licensing cost associated with using the licensable resource for execution of the workload with a cost of using existing capabilities of the computing device for execution of the workload, wherein the per-use licensing cost comprises a monetary cost of the per-use license at the time of execution of the workload plus a monetized cost associated with execution of the workload on the licensable resource at the time of execution of the workload and the cost of using existing capabilities comprises a monetized cost associated with execution of the workload with the existing capabilities at the time of execution of the workload;
automatically licensing, using a license distributor, the licensable resource without user input and using the licensable resource for a duration of execution of the workload, using a workload executor, at the scheduled time in response to determining that, at the time the workload is scheduled for execution, the per-use licensing cost of the licensable resource is less than using the existing capabilities of the computing device; and
using the existing capabilities of the computing device to execute the workload using the workload executor, at the scheduled time without licensing the licensable resource in response to determining that, at the time the workload is scheduled for execution, using the existing capabilities of the computing device is less than the per-use licensing cost.

10. The method of claim 9, further comprising determining when a license for the licensable resource is available from a pool of licenses in response to determining that the workload is scheduled to be executed by the computing device.

11. The method of claim 9, wherein the licensable resource comprises a hardware resource and/or a software resource.

12. A program product comprising a computer readable storage medium comprising program code, the program code being configured to be executable by a processor to perform operations comprising:

training a neural network using machine learning during a training phase to build a use history the use history comprising a per-use licensing cost of one or more licensable resources available to one or more computing devices and a cost of using existing capabilities of the one or more computing devices, the neural network using workload analytics from the one or more computing devices to build the use history of workloads comparable to a workload scheduled to be executed by a computing device of the one or more computing devices;

determining, using a workload scheduler, that the workload is scheduled to be executed by the computing device, the computing device comprising a licensable resource available for execution of the workload at a time the workload is scheduled for execution;

comparing, using a cost comparator, a per-use licensing cost associated with using the licensable resource for execution of the workload with a cost of using existing capabilities of the computing device for execution of the workload, wherein the per-use licensing cost comprises a monetary cost of the per-use license at the time of execution of the workload plus a monetized cost associated with execution of the workload on the licensable resource at the time of execution of the workload and the cost of using existing capabilities comprises a monetized cost associated with execution of the workload with the existing capabilities at the time of execution of the workload;

automatically licensing, using a license distributor, the licensable resource without user input and using the licensable resource for a duration of execution of the workload, using a workload executor, at the scheduled time in response to determining that, at the time the workload is scheduled for execution, the per-use licensing cost of the licensable resource is less than using the existing capabilities of the computing device; and using the existing capabilities of the computing device to execute the workload, using the workload executor, at the scheduled time without licensing the licensable resource in response to determining that, at the time the workload is scheduled for execution, using the existing capabilities of the computing device is less than the per-use licensing cost.

13. The program product of claim 12, the code further configured to be executable by a processor to perform operations comprising determining if a license for the licensable resource is available from a pool of licenses in response to determining that the workload is scheduled to be executed by the computing device.

* * * * *